United States Patent [19]

Binder

[11] Patent Number: 4,824,021
[45] Date of Patent: Apr. 25, 1989

[54] WINDOW WASHING SYSTEM FOR MOTOR VEHICLES

[75] Inventor: Hartmut Binder, Leonberg, Fed. Rep. of Germany

[73] Assignee: Dr. Ing. h.c.F. Porsche Aktiengesellschaft, Stuttgart, Fed. Rep. of Germany

[21] Appl. No.: 171,391

[22] Filed: Mar. 21, 1988

[30] Foreign Application Priority Data

Mar. 26, 1987 [DE] Fed. Rep. of Germany ....... 3709926

[51] Int. Cl.⁴ ............................................... B05B 1/10
[52] U.S. Cl. ......................... 239/284.1; 239/DIG. 23; 210/416.1; 417/430
[58] Field of Search ..................... 239/284.1, 575, 540, 239/590.3, DIG. 23; 210/413, 416.1; 417/430; 415/121.6

[56] References Cited

U.S. PATENT DOCUMENTS

| | | | |
|---|---|---|---|
| 669,589 | 3/1901 | Packer | 417/430 X |
| 2,392,666 | 1/1946 | Harris | 210/416 X |
| 2,522,928 | 9/1950 | Carroll | 239/590.3 |
| 2,684,632 | 7/1954 | Horton | 239/284.1 X |
| 2,973,905 | 3/1961 | Ackley | 239/575 X |
| 3,782,640 | 1/1974 | Kirshmann | 239/575 X |
| 4,217,220 | 8/1980 | Egli et al. | 210/413 X |
| 4,337,158 | 6/1982 | Bodine | 210/413 X |
| 4,444,358 | 4/1984 | Spohn | 239/284.1 |
| 4,655,868 | 8/1987 | Bodensteiner | 417/430 X |

Primary Examiner—Andres Kashnikow
Assistant Examiner—Kevin P. Weldon
Attorney, Agent, or Firm—Bdarnes & Thornburg

[57] ABSTRACT

A windshield washing installation for a motor vehicle includes a reservoir tank for the washing liquid and a feed pump, especially a vane-type pump. A suction pipe of the feed pump is inserted into the reservoir tank under interposition of a sealing member, whereby an agitator arranged inside of the suction pipe is in contact with its free end directly with the washing liquid. In order to avoid a clogging of the spray nozzles of such a windshield washing installation, a lower end area of the suction pipe is surrounded by a sieve element.

15 Claims, 2 Drawing Sheets

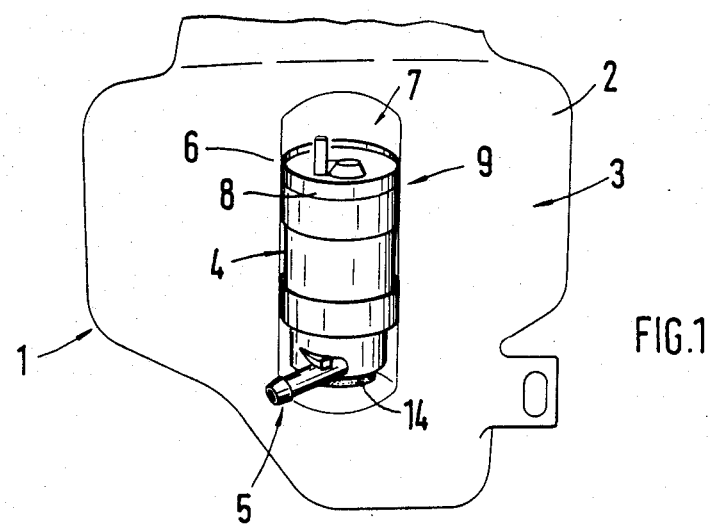
FIG.1
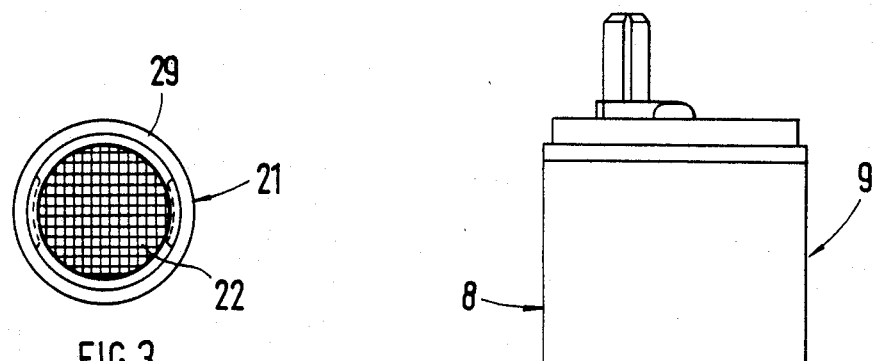
FIG.3
FIG.4
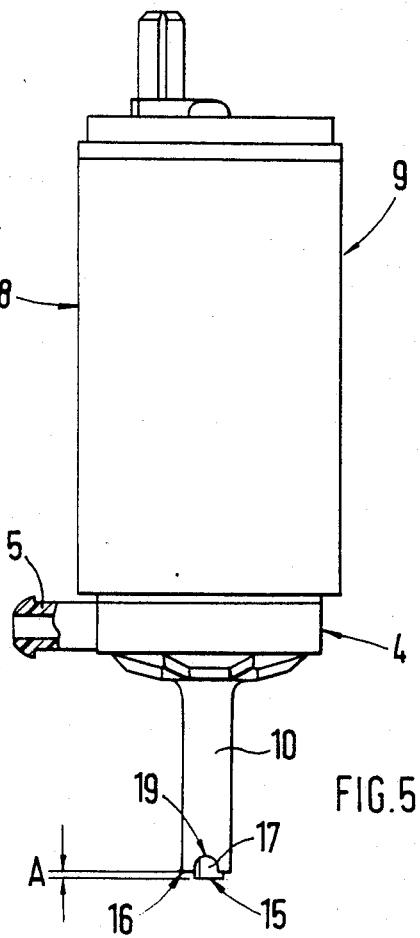
FIG.5

WINDOW WASHING SYSTEM FOR MOTOR VEHICLES

BACKGROUND OF THE INVENTION

The present invention relates to a window washing installation for motor vehicles with a reservoir tank for the washing liquid and a feed pump, especially a vane-type pump, in which a suction pipe of the feed pump is inserted into the reservoir tank under interposition of a sealing member and protrudes sectionwise into the interior of the tank and in which an agitator disposed inside of the suction pipe extends approximately up to the free end of the suction pipe and is thereat directly in contact with the washing liquid.

In a known windshield washing installation (DE-GM No. 19 49 575), a gear pump is provided for the feed of the washing liquid which is inserted from above into an opening of the reservoir tank. A suction pipe for the pump unit extends approximately up to the bottom of the reservoir tank and is closed off at the end with a sieve insert whereby a clogging of the spray nozzles of the windshield washing installation is avoided. This prior art arrangement entails the disadvantage that such gear pumps are costly and require a large structural space.

For avoiding the aforementioned disadvantages, frequently vane-type pumps are therefore used which require less structural space and can be manufactured in a more economic manner. A rotating agitator which is provided in these vane-type pumps inside of the suction pipe, protrudes beyond the suction pipe end by a slight amount. Furthermore, apertures open in the downward direction and diametrally arranged at the suction pipe end are provided so that the end area of the agitator has direct contact with the washing liquid and the vane-type pump operates self-priming.

The problem occurs in practice with windshield washing installations equipped with vane-type pumps that the spray nozzles become clogged up by contaminations or small particles contained in the washing liquid (for example, cleaning tablets) because a direct closing off of the suction pipe end by means of a sieve insert is not possible for functioning reasons. For if one were to close off the suction pipe end directly with a sieve insert, then the agitator would no longer have a direct contact with the washing liquid and an air cushion would be formed at the agitator end which brings about that the feed pump no longer operates self-priming.

It is the object of the present invention to undertake in a window washing installation with a self-priming vane-type pump such measures that a clogging of the spray nozzles is avoided together with good functioning of the vane-type pump.

The underlying problems are solved according to the present invention in that a lower end area of the suction pipe is surrounded by a sieve element.

The principal advantages achieved with the present invention reside in that by the arrangement of a sieve element surrounding the lower end area of the suction pipe and locally provided with sieve inserts, on the one hand, a clogging of the spray nozzles is avoided and in that, on the other, the self-priming action of the vane-type pump is always assured because the free end of the agitator is continuously in direct contact with the washing liquid. The sieve element represents a component which can be manufactured in a simple and economic manner. A simple and rapid assembly of the sieve element and of the feed pump is realized by a clamping-type fastening arrangement of the sieve element at the sealing body. Additionally, the sieve element is readily interchangeable.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 1 is a perspective view on a reservoir tank and a feed pump of a window washing installation for a motor vehicle in accordance with the present invention, on a reduced scale;

FIG. 3 is an elevational view in the direction of arrow R of FIG. 2, on an enlarged scale;

FIG. 4 is an elevational view in the direction of arrow S of FIG. 2, on an enlarged scale; and FIG. 5 is a side elevational view of the feed pump, partly in cross section.

DETAILED DESCRIPTION OF THE DRAWINGS

Figure 2:
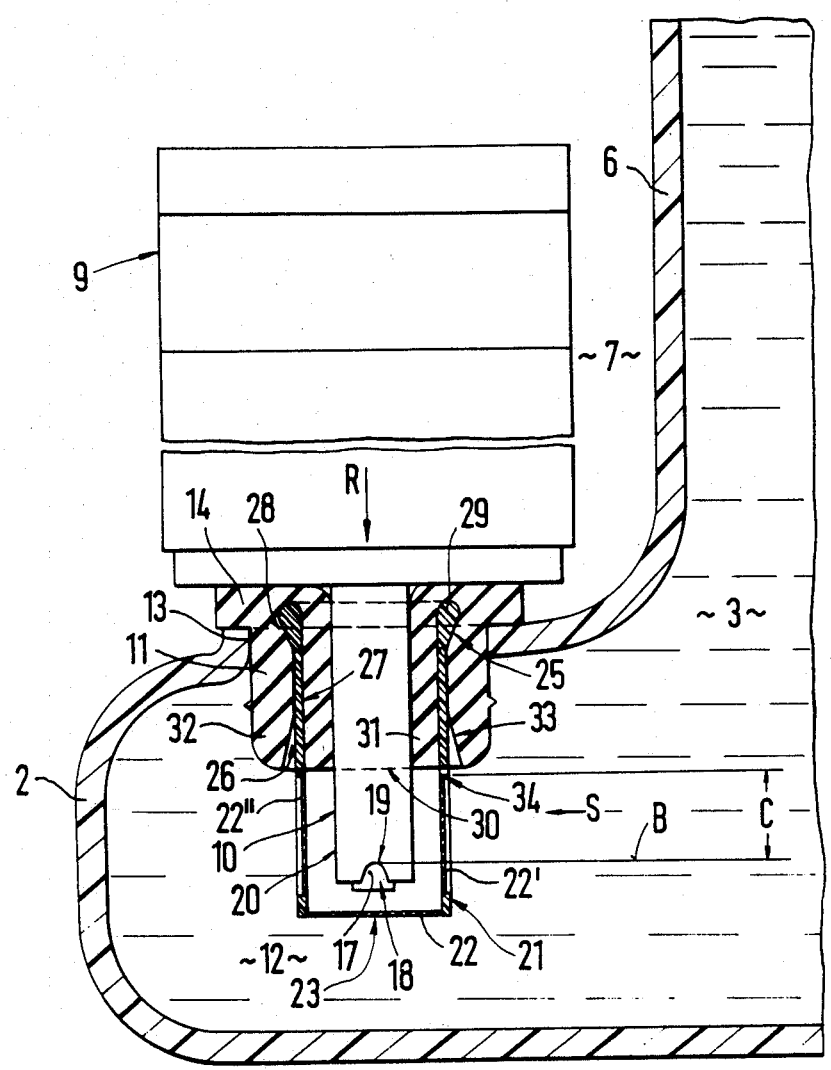
FIG. 2 is a vertical cross section through the reservoir tank and the feed pump, on an enlarged scale.

Referring now to the drawing wherein like reference numerals are used throughout the various views to designate like parts, the window washing installation 1 illustrated in FIG. 1 for through-vision windows of motor vehicles (windshield, rear window) or cover windows of motor vehicle lights includes a reservoir tank 2 for the washing liquid 3 and a feed pump 4 which is connected by way of a connecting nipple 5 with a line (not shown) that leads to a spray nozzle of a spray device. The reservoir tank 2 consisting of plastic material includes in a side wall 6 a recess 7 open toward the outside for the accommodation of a structural unit 9 consisting of the feed pump 4 and of a motor 8.

The recess 7 is delimited laterally by a cylindrical wall section and at the bottom by a flat wall section of the reservoir tank 2 whereby the diameter of the cylindrical wall section corresponds approximately to the diameter of the housing of the structural unit 9. During the assembly, the structural unit 9 is inserted from above into the recess 7, whereby a suction pipe 10 of the feed pump 4 is inserted into the reservoir tank 2 under interposition of a sealing member 11. The suction pipe 10 protrudes sectionwise into the tank interior space 12. The sealing member 11 made of plastic or rubber abuts under prestress, on the one hand, at the outer circumference of the suction pipe 10 and, on the other, at the inner circumference of an insertion opening 13 of the reservoir tank 2. Outside of the reservoir tank 2, the sealing member 11 includes an end-face collar 14 which has a larger diameter than the insert opening 13. The collar 14 extends between the top side of the insert opening 13 and the structural unit 9 disposed thereabove.

The feed pump 4 is formed in the illustrated embodiment by a vane-type pump (centrifugal pump), whereby a rotating agitator 15 is arranged inside of the suction pipe 10 which extends approximately up to the free lower end 16 of the suction pipe 10. According to FIG. 5, the agitator 15 protrudes downwardly beyond the end 16 of the suction pipe 10 by the distance A. Furthermore, preferably two diametrally oppositely disposed apertures 17 constructed approximately semi-circularly shaped are provided in the suction pipe 10 which extend upwardly from the free end 16 of the suction pipe 10. The lower end area 18 of the agitator 15 is directly in contact with the washing liquid 3 by way of these apertures 17 and the vane-type pump operates self-priming. The functioning of the vane-type pump is then assured if the washing liquid 3 has a minimum level B or a higher liquid level. The minimum level B lies in a horizontal plane which is tangential to the upper end 19 of the aperture 17.

In order that the spray nozzles of the windshield washing system 1 cannot become clogged by contaminations or small particles contained in the washing liquid 3 (for example, of cleaning tablets), a lower end area 20 of the suction pipe 10 is surrounded by a sieve element 21. The sieve element 21 is constructed pot-shaped and can be provided with sieve inserts 22, 22', 22" either over the entire circumference or only locally.

Corresponding to FIG. 2, a circularly shaped sieve insert 22 is provided at the bottom 23 of the sieve element 21 which has approximately the size of the inner cross-sectional area of the sieve element 21. Furthermore, two diametrally oppositely disposed sieve inserts 22' and 22" are arranged along the outer cylindrical surface 24 which are constructed approximately rectangularly shaped as viewed in side view. The pot-shaped sieve element 21 is constructed cylindrically according to FIG. 2 and extends radially and axially with a spacing with respect to the suction pipe 10. The sieve inserts 22' and 22" arranged at the outer surface 24 protrude beyond the upper edge 19 of the aperture 17 provided in the suction pipe 10 by a distance C (FIG. 2). It is assured thereby that the lower end 18 of the agitator 15 is constantly in contact with the washing liquid 3. The sieve element 21 can be secured either at the suction pipe 10 or at the sealing member 11 disposed thereabove.

A particularly simple and cost-favorable mounting of the sieve element 21 is achieved according to FIG. 2 in that the sieve element 21 cooperates with the sealing member 11 by way of a clamping-type fastening arrangement 25. For that purpose, a circularly shaped groove 26, as viewed in plan view, is provided at the sealing member 11 which is constructed open in the downward direction and into which an upper section 27 of the sieve element 21 is inserted. The upper section 27 of the sieve element 21 is form-lockingly and force-lockingly connected with the sealing member 11. A cross-sectional enlargement 29 is provided at the upper edge 28 of the sieve element 21 which, for example, is constructed pot-shaped. The inner diameter of the sieve element 21 is constant as viewed over its entire height dimension.

The groove 26 in the sealing member 11 extends approximately from the collar 14 in the sealing member 11 up to the bottom area 30 thereof. The sealing member 11 is subdivided by the groove 26 into an inner ring 31 and an outer ring 32, between which the sieve element 21 is received. Adjacent the bottom area 30, a conically shaped inclined butting surface 33 is provided at the outer ring 32 on the side facing the sieve element 21 which facilitates the assembly of the sieve element 21.

An upper boundary edge 34 of the sieve inserts 22' and 22" disposed in the outer cylindrical surface extends adjacent the bottom surface 30 of the sealing element 11.

The sieve element 21 is made of suitable plastic material. The sieve inserts 22 are also made of plastic material or metal and have a corresponding mesh width.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A window washing installation for motor vehicles, comprising reservoir tank means for the washing liquid, self-priming centrifugal feed pump means including a suction pipe, the suction pipe being inserted into the reservoir tank means under interposition of a sealing means and protruding sectionwise into the tank interior space, agitator means for priming said centrifugal pump means with washing liquid from the reservoir tank means disposed inside of the suction pipe and extending approximately to the free end of the suction pipe and is thereat in contact directly with the washing liquid by way of at least one aperture means open in the downward direction and provided along the circumference of the suction pipe, and sieve means surrounding and spaced from the lower end area of the suction pipe, to maintain the agitator means in direct contact with the washing liquid and prevent the formation of an air cushion.

2. A window washing installation according to claim 1, wherein the sieve means is constructed pot-shaped, and sieve inserts are provided at least in the outer surfaces of the sieve means.

3. A window washing installation according to claim 2, wherein at least one sieve insert is provided also in the bottom of the sieve means.

4. A window washing installation according to claim 3, wherein the sieve insert at the bottom of the sieve means is constructed circularly shaped and has approximately the size of the inner cross-sectional area of the sieve means.

5. A window washing installation according to claim 4, wherein the pot-shaped sieve means extends radially and axially with a spacing with respect to the suction pipe.

6. A window washing installation according to claim 5, wherein two diametrally oppositely disposed sieve inserts are provided in the outer surface of the sieve means, said two sieve inserts protruding beyond the upper edge of the aperture means arranged in the suction pipe by a predetermined amount.

7. A window washing installation according to claim 6, wherein the sieve means is retained in position at the sealing means disposed thereabove by way of a fastening arrangement.

8. A window washing installation according to claim 7, wherein a circularly-shaped groove open in the downward direction is provided in the sealing means, into which an upper section of the sieve means is inserted and is form-lockingly and force-lockingly retained in position.

9. A window washing installation according to claim 8, wherein the sieve means includes a cross-sectional enlargement at its upper edge.

10. A window washing installation according to claim 2, wherein the pot-shaped sieve means extends radially and axially with a spacing with respect to the suction pipe.

11. A window washing installation according to claim 2, wherein two diametrally oppositely disposed sieve means, said two sieve inserts protruding beyond the upper edge of the aperture means arranged in the suction pipe by a predetermined amount.

12. A window washing installing according to claim 1, wherein the sieve means is retained in position at the sealing means disposed thereabove by way of a fastening arrangement.

13. A window washing installation according to claim 12, wherein a circularly-shaped groove open in the downward direction is provided in the sealing means, into which and upper section of the sieve means is inserted and is form-lockingly and force-lockingly retained in position.

14. A window washing installation according to claim 13, wherein the sieve means includes a cross-sectional enlargement at its upper edge.

15. A window washing installation according to claim 12, wherein the sieve means includes a cross-sectional enlargement at its upper edge.

* * * * *